Feb. 10, 1931.  M. TRESCHOW  1,792,049
WHEEL
Filed Nov. 2, 1929  2 Sheets-Sheet 1
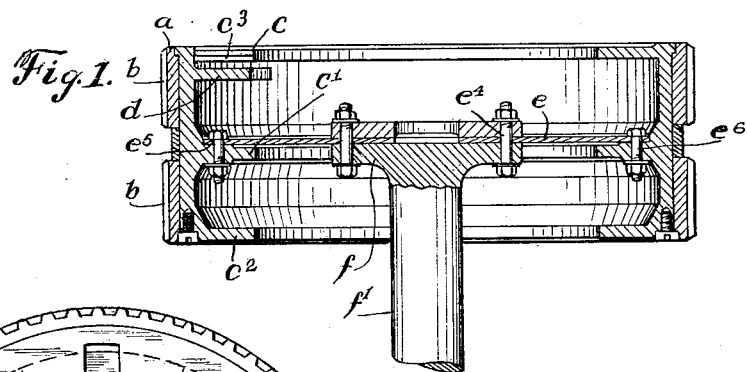
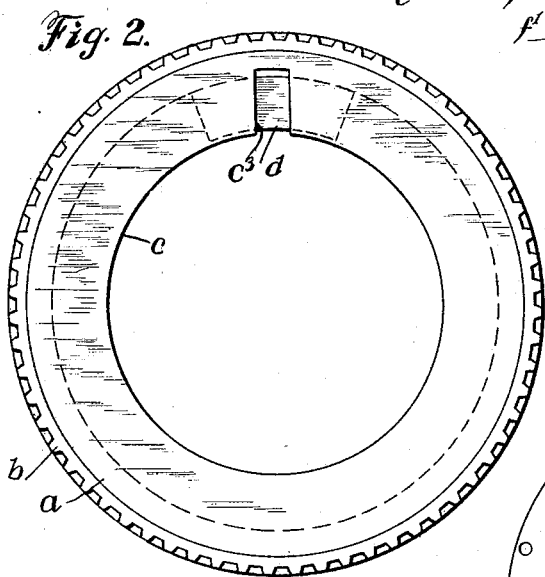
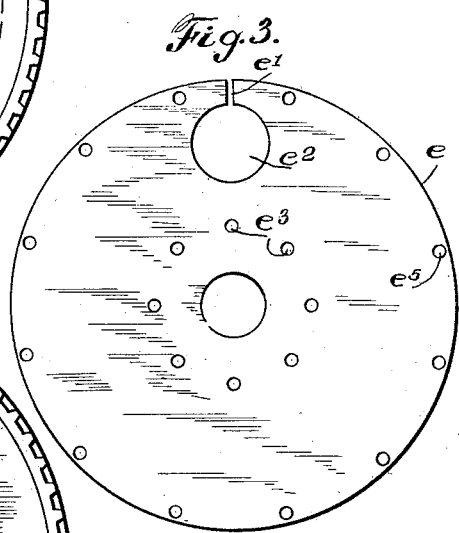
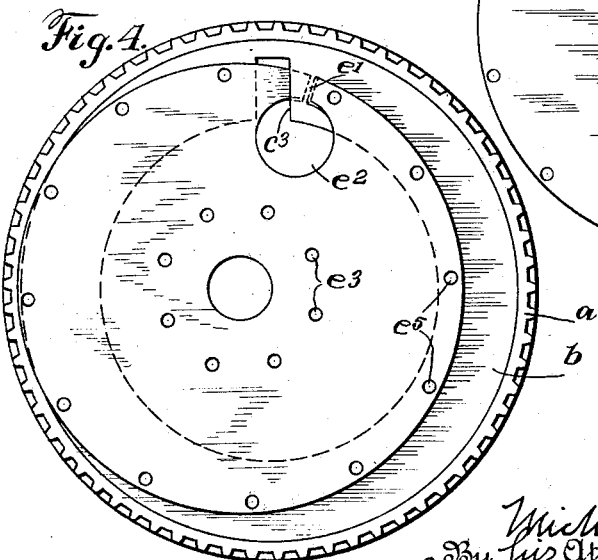

Feb. 10, 1931.  M. TRESCHOW  1,792,049

WHEEL

Filed Nov. 2, 1929  2 Sheets-Sheet 2

Inventor
Michael Treschow
By his Attorneys
Redding, Greeley, O'Shea Campbell

Patented Feb. 10, 1931

1,792,049

UNITED STATES PATENT OFFICE

MICHAEL TRESCHOW, OF BROOKLYN, NEW YORK, ASSIGNOR TO F. L. SMIDTH & CO., OF NEW YORK, N. Y., A CORPORATION OF NEW JERSEY

WHEEL

Application filed November 2, 1929. Serial No. 404,276.

This invention relates to wheels, particularly gear wheels, which are so supported as to be capable of slight movement in an axial direction as for the purpose of permitting the teeth of a herring-bone gear, for example, to adapt themselves to the teeth of a coacting gear. In the construction of such wheels the rim is commonly secured to the edge of a disc or membrane, usually of somewhat resilient metal, which is mounted upon a supporting shaft. In order that lightness in weight and necessary strength may be secured the rim is usually formed with internal webs or flanges, relatively thin but of considerable radial depth, thus restricting, in the ordinary construction, the diameter of the flexible disc or membrane, the flexibility of which is directly proportional to the square of its diameter and is inversely proportional to the cube of its thickness. The purpose in view in the present invention has been to provide a construction which will permit the provision of the deep flanges of the rim and at the same time the use of a supporting disc or membrane which has a diameter greater than the diameter of the circular opening within the flange. In accordance with the invention the internal flange is slotted radially at one point. The rim is reinforced at that point by a relatively short reinforcing web which is offset inwardly from the flange and overlaps the slot of the flange, and the disc is slotted at its edge so that the disc can be introduced within the flange by a screw motion. It will be understood that the disc, as it will be referred to hereinafter, may be a single disc or a multiple disc, made up of several separate sheets, as conditions may require. It will also be understood that suitable provisions are made for securing the rim to the disc and for securing the disc to its supporting shaft.

The invention will be more fully explained hereinafter with reference to the accompanying drawings in which it is illustrated, and in which:

Figure 1 is a view in diametrical section of a gear wheel which embodies the invention, the supporting shaft being shown in elevation.

Figure 2 is a view of the rim of the gear wheel as seen from the righthand in Figure 1.

Figure 3 is a view in elevation of the disc shown in Figure 1.

Figure 4 is a view in elevation, as seen from the righthand in Figure 1, showing the rim and the disc at one stage of assembly.

Figure 5:
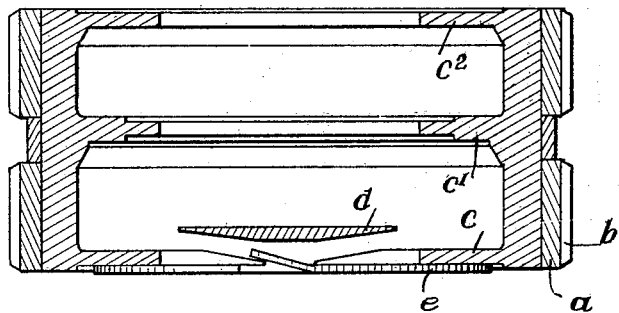
Figures 5, 6, 7 and 8 are detail views illustrating successive stages in the assembly of the rim and disc.
Figure 6:
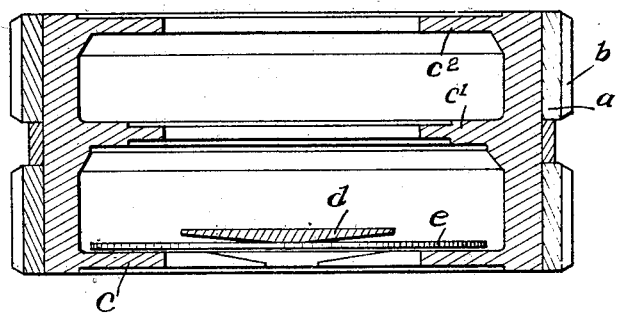

In the embodiment of the invention illustrated in the drawings the wheel rim $a$ is shown as provided with duplex toothed rings $b$, which may be regarded as parts of the rim. The rim is also shown as relatively light in weight and as strengthened by internal webs or flanges $c$, $c^1$ and $c^2$, these flanges being relatively thin, for lightness, but relatively deep in order to give the rim the necessary strength. The web or flange $c^1$ is shown as adapted for connection with the disc, as hereinafter explained, and the web or flange $c^2$ is shown as continuous, having no slot. The flange $c$, however, is shown as provided at one point with a slot $c^3$ which is extended to the full depth of the flange and has a substantial but not excessive width, as represented in Figure 2. The flange $c^2$ might be slotted in order to permit the introduction of a disc, if so desired, but ordinarily it will be sufficient to provide one slotted flange. Offset inwardly from the flange $c$ is a reinforcing web $d$, which is of substantially the same depth as the flange $c$ and is of sufficient length to overlap the slot $c^3$, as shown in Figure 2, and so compensate for the weakening of the flange by the slot. The web $d$ is offset from the flange sufficiently to facilitate the assembly of the parts, as hereinafter described, and the inner faces of the flange, adjacent the slot, and the outer faces of the reinforcing web are chamfered, as shown in Figures 5, 6, 7 and 8, also to facilitate the assembly of the parts.

The disc $e$, which has a diameter greater than the diameter of the circular opening left by the flange $c$, is slotted, as at $e^1$, and provided with a larger opening, as at $e^2$, with which the slot $e^1$ communicates. The disc is provided with a circular series of holes $e^3$, through which may be passed bolts $e^4$, to secure the disc to the flange $f$ of the supporting shaft $f^1$ and it is also provided, near its periphery, with a series of holes $e^5$ to receive bolts $e^6$ by which the disc is secured to the flange $c^1$ of the wheel rim, this flange being suitably formed to receive the disc.

Figure 7:
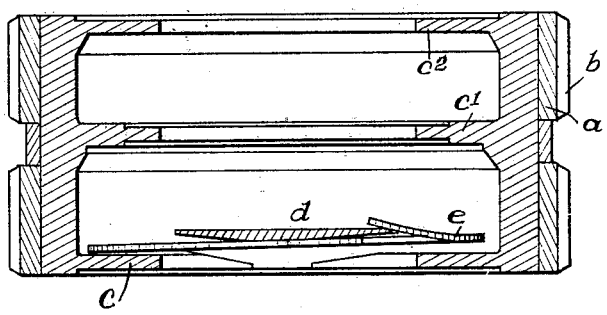
Figure 8:
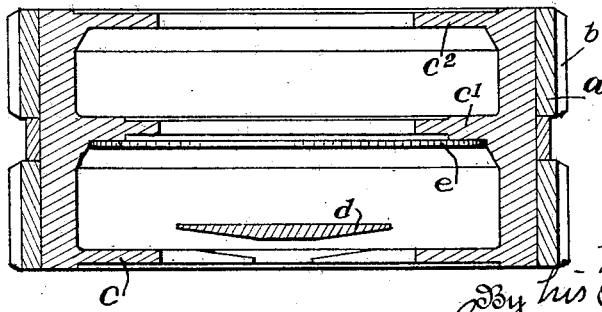

In assembling the disc and the rim one lip of the disc, adjacent the slit $e^1$, is deflected and, as shown in Figures 4 and 5, is introduced into the slot $e^3$ and between the flange $c$ and the reinforcing web $d$. The disc is then rotated until it assumes the position shown in Figure 6. Then one lip of the disc is sprung over the end of the reinforcing web $d$, as shown in Figure 7, and the disc is then rotated as before until it passes within the reinforcing web $d$, after which it is secured to the flange $c^1$ of the wheel and to the flange $f$ of the shaft, as previously described.

It will be understood that when the disc is made up of multiple sheets, as indicated in Figure 1, the several sheets may be rotated relatively to each other so that the slits $e^1$ and openings $e^2$ will be distributed circumferentially so as to secure uniform action.

It will be understood that various changes can be made to suit conditions of use and that, except as pointed out in the accompanying claims, the invention is not restricted to the particular construction shown and described herein.

I claim as my invention:

1. In a wheel, a rim having an internal flange slotted at one point and a reinforcing web offset from the flange, a flexible disc having a diameter greater than the diameter of the opening within the flange and slitted at one point, a supporting shaft, and means to secure the disc to the rim and to the supporting shaft.

2. In a wheel, a rim having an internal flange slotted at one point and a reinforcing web offset from the flange, a flexible disc having a diameter greater than the diameter of the opening within the flange and slitted at its edge at one point and having an opening with which the slit communicates, a supporting shaft, and means to secure the disc to the rim and to the supporting shaft.

3. In a wheel, a rim having internal flanges one of which is slotted at one point and a reinforcing web offset from the slotted flange, a flexible disc having a diameter greater than the diameter of the opening within the flange and slit at one point, a supporting shaft, and means to secure the disc to one of the flanges of the rim and to the supporting shaft.

This specification signed this 1st day of November A. D. 1929.

MICHAEL TRESCHOW.